United States Patent [19]

Wokeck

[11] Patent Number: 4,781,271
[45] Date of Patent: Nov. 1, 1988

[54] WHEEL CHOCK BLOCKS

[76] Inventor: Arthur Wokeck, 204 Devon Dr., Mauldin, S.C. 29662

[21] Appl. No.: 885,925

[22] Filed: Jul. 15, 1986

[51] Int. Cl.⁴ .............................. B60J 3/00; G08J 9/36
[52] U.S. Cl. ......................................... 188/32; 521/54
[58] Field of Search ....................... 188/32; 428/319.9; 521/918, 54, 55; 714/356; 441/74

[56] References Cited

U.S. PATENT DOCUMENTS

| | | | |
|---|---|---|---|
| 3,906,127 | 9/1975 | Hollmann et al. | 428/319.9 X |
| 3,967,704 | 7/1976 | Ogden | 188/32 |
| 4,036,675 | 7/1977 | Amberg et al. | 428/319.9 X |
| 4,098,944 | 7/1978 | Pollock | 428/319.9 X |

FOREIGN PATENT DOCUMENTS

| | | | |
|---|---|---|---|
| 2455523 | 5/1976 | Fed. Rep. of Germany | 521/55 |
| 3002809 | 7/1981 | Fed. Rep. of Germany | 188/32 |
| 0085955 | 12/1971 | German Democratic Rep. | 521/54 |

OTHER PUBLICATIONS

Dyplast "Expanded Polystyrene Insulation and Construction Materials", brochure, 4 pages.
3 pages of various advertisements related to Wheel Chock Block.

*Primary Examiner*—Andres Kashnikow
*Assistant Examiner*—Richard Potosnak
*Attorney, Agent, or Firm*—Dority & Manning

[57] ABSTRACT

Wheel chock blocks may be comprised of bodies of various ultra-lightweight foam materials, such as expanded polystyrene. A coating may be provided which integrally covers such bodies to form a skin effect for dispersing pressures applied thereto over such body. Thus, effective use is made of the entire compressive strength of the block, which further permits practical use of even such ultra-lightweight materials. Such coating may be formed with hardened latex paint, which paint also slightly penetrates the foam body so as to further enhance the skin effect thereof.

1 Claim, 2 Drawing Sheets

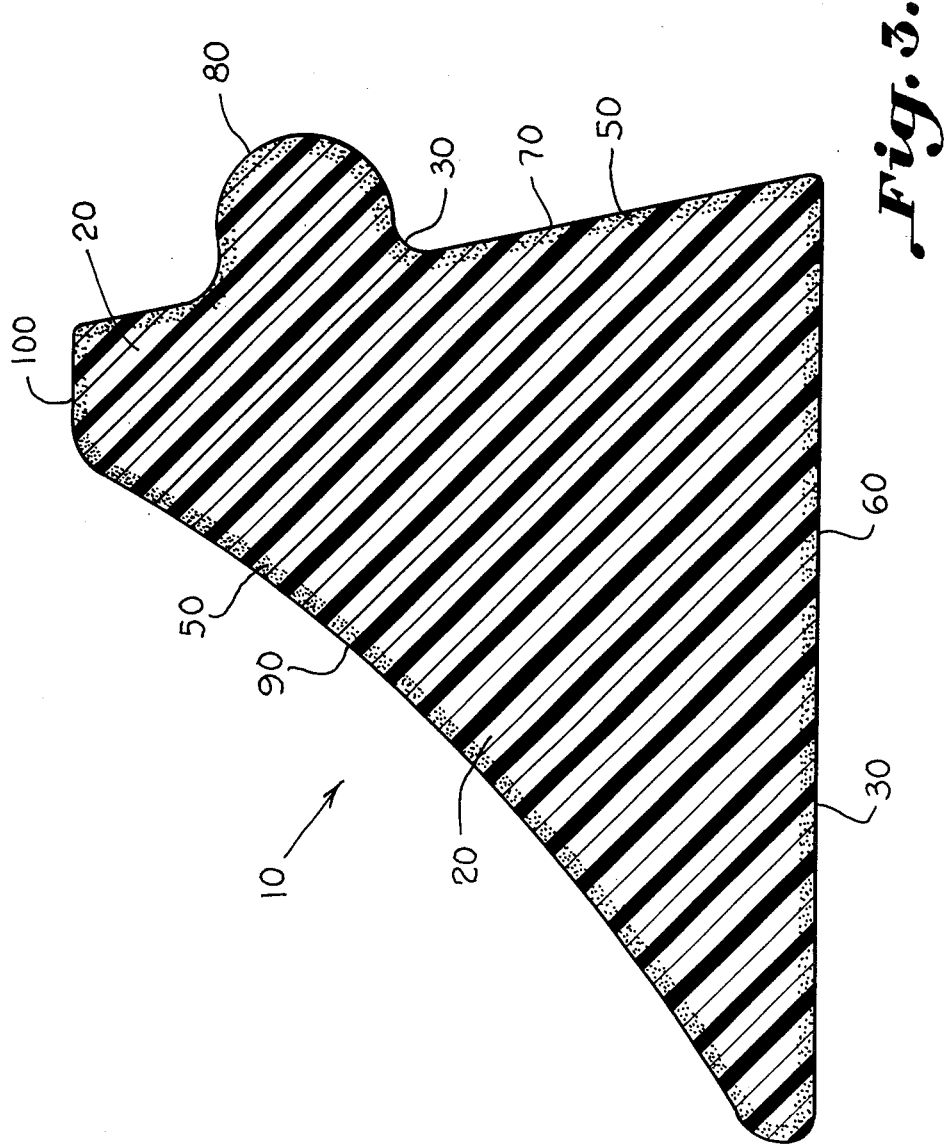

WHEEL CHOCK BLOCKS

BACKGROUND OF THE INVENTION

The present invention concerns subject matter submitted to the U.S. Patent and Trademark Office in August, 1984 under the Disclosure Document Program, and assigned document No. 130,333.

The invention in general concerns blocks for vehicle wheels, and in particular wheel chock blocks primarily comprising foam plastics which are ultra-lightweight and very inexpensive to produce.

Wheel chocks are generally well-known for operative association with vehicle wheels so as to lock such wheels securely in place. They may typically be constructed as a triangular arrangement with a flat bottom for resting usually on a common surface with the wheel to be secured in place, an angled or straight back, and a contoured or flat surface for connecting the bottom and angled back surfaces and for engaging a vehicle wheel. Individual blocks may comprise conventionally heavy duty rubber materials, and steel or aluminum materials, and be of either solid or open constructions. Such blocks often may range in weight from several pounds up to 10 pounds each. Furthermore, because of their particular configurations and different engagement surfaces or the like, such blocks may require time-consuming metal working or other fabrication techniques, and thus be relatively expensive to manufacture with a resulting high cost for consumers.

Wheel chocks may also be constructed from other materials, such as solid urethane or polyurethane but still may weigh as much as 5½ pounds each, and often feature a transverse hole lined with a steel sleeve or the like to provide extra strength It is also not uncommon for chocks made of such material to be larger than some chocks made of rubber or various metals, to apparently compensate for lack of effective strength sufficient to constitute a practical chock block for engaging and supporting (i.e. stopping) vehicle wheels.

SUMMARY OF THE PRESENT INVENTION

One object of the present invention is to provide a practical wheel chock block which is ultra-lightweight and produced relatively inexpensively, but without compromising load bearing characteristics thereof.

A further object of this invention is to provide a practical wheel chock block comprised of foam plastic materials which have relatively low density and relatively high compression strength.

It is yet another object of the present invention to provide a wheel chock block which may comprise ultra-lightweight materials, while including further features resulting from various treatments of or additions to such materials which enhance the performance of the chock block by dispersing loads applied to such block over the entire block.

Another object is to provide a chock block made from foam materials but impervious to common solvents such as gasoline, oil, and the like.

While various objects and features of the present invention are disclosed herewith, different combinations of such features may be practiced for constructing a given wheel chock block constituting an embodiment in accordance with the present invention. All such combinations of features are intended as constructions in accordance with this invention. For example, one exemplary embodiment in accordance with features of the present invention may be directed to a chock block for a vehicle wheel, comprising a body of lightweight material, having a density in the range of 1.5 to 2.0 pounds per cubic foot, and having a predetermined shape adapted to engage a vehicle wheel so as to prevent rotation of same towards the body.

Another exemplary embodiment in accordance with this invention concerns a lightweight block of predetermined shape for use in preventing the rotation of a wheel, comprising: a main body having a flat bottom support surface, an angled bracing surface, and a contoured wheel engaging surface substantially connecting with the other of the surfaces; and sheathing means for integrally covering said main body, such that pressure from a wheel engaged with the contoured surface is effectively distributed over all of the main body so as to effectively increase the compressive strength thereof.

Yet another exemplary construction in accordance with the present features is directed to a lightweight chock block of predetermined shape for use with a vehicle wheel, comprising: a solid body of expanded polystyrene having a density of no more than 2.0 pounds per cubic foot; a handle member formed integrally with the body, and adapted for manipulation by a user of the block; and a coating applied over the entire outer surface of the body and the member, and slightly penetrating same; wherein the body, the handle member, and the coating function as an integral unit so as to distribute over such integral unit pressure applied to any part thereof by a vehicle wheel.

In addition to the specific embodiments disclosed and discussed herein as exemplary constructions in accordance with this invention, modifications and variations to features and elements of this invention will occur to one of ordinary skill in the art. All such variations, and equivalent substitutions and the like for same, are intended to come within the scope of the present invention by virtue of present reference thereto.

BRIEF DESCRIPTION OF THE DRAWINGS

A full and enabling disclosure of the present invention, including the best mode thereof, is set forth in the following specification, which includes reference to the appended figures, in which:

FIG. 3 illustrates a side cross-sectional view of the embodiment of FIG. 2, taken along the line 3—3 as indicated therein.

Figure 1:
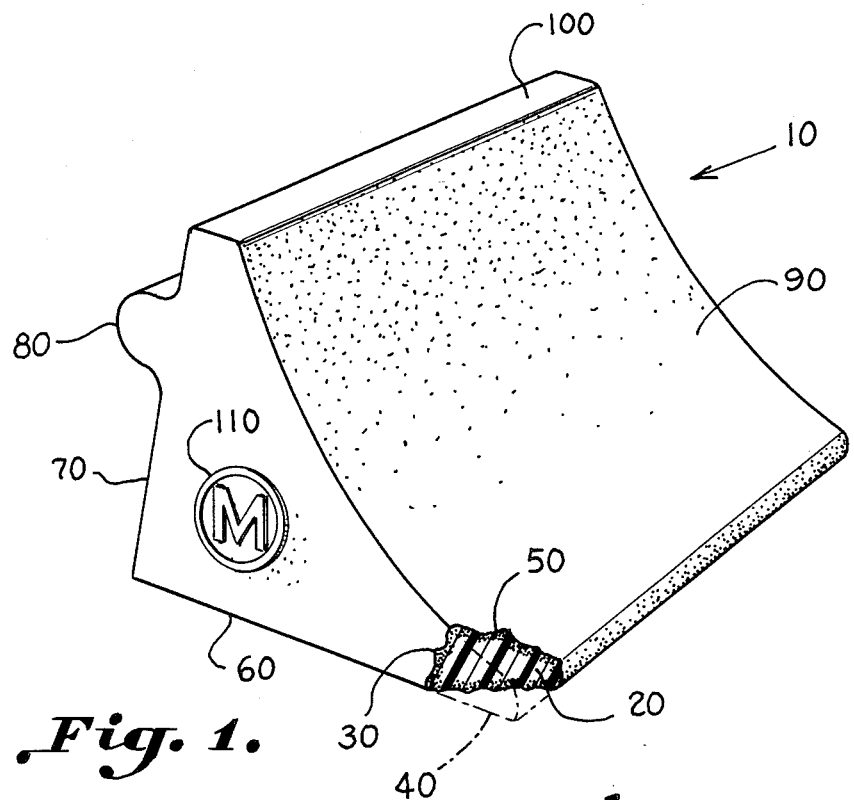
FIG. 1 illustrates a substantially frontal perspective view of a exemplary chock block constructed in accordance with features of the present invention.

Repeat use of reference characters throughout the following specification and in the appended drawings is intended to indicate same or analogous features or elements of this invention.

DETAILED DESCRIPTION OF THE PREFERRED EMBODIMENT

Figure 2:
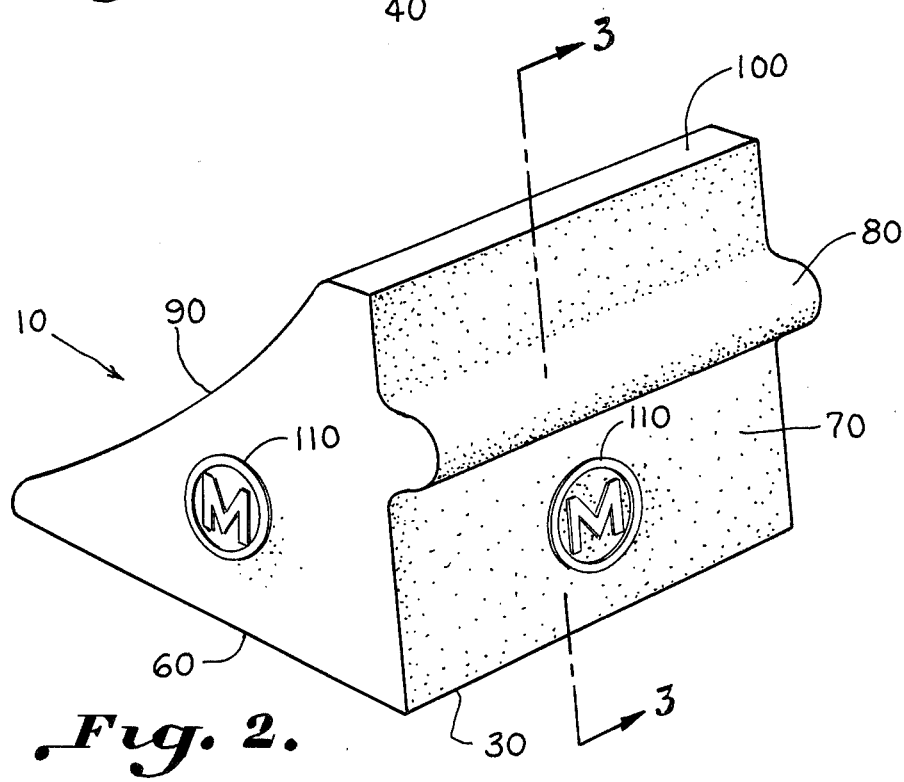
FIG. 2 illustrates a substantially rear perspective view of the exemplary embodiment of FIG. 1.

FIGS. 1 and 2 illustrate front and rear, respectively, perspective views of an exemplary embodiment of a wheel chock block having features of this invention. Block 10 includes a main body 20 and a sheathing or coating 30. Main body 20 may be comprised of a variety of foam plastic materials, but preferably comprises expanded polystyrene materials, for example such as produced by the Dyplast Company of Miami, Fla. 33144.

Likewise, the coating or sheeting 30 may comprise various materials which are sprayed, painted, dipped or otherwise secured to main body 20, but preferably comprises readily available latex paints applied thereto which then harden to form an integral coating over the entire main body 20. The hardness of such coating may be enhanced with subsequent treatments of additional latex paint coats or the like.

A dotted line section 40 of the FIG. 1 illustration is cut away so that main body 20 may be illustrated as enclosed within coating 30. Further, and particularly whenever the preferred latex paint coatings are used over the preferred body materials of expanded polystyrene, coating 30 penetrates into main body 20. Penetration, represented by a plurality of dots 50 (see FIGS. 1 and 3), typically extends from one-eighth to one quarter of an inch into main body 20.

Such penetration coupled with the hardening of the latex paint over the entire main body 20 provides a skin effect for such body which effectively disperses over such body pressure applied at any particular point on or any surface of such body. Thus, the compressive strength characteristics of main body 20 are more effectively and completely utilized. Such skin effect further contributes to achieving the present object generally of providing a practical wheel chock block primarily comprised of ultra-lightweight materials.

Also, the latex paint forms a protective coating to render the foam material impervious to common solvents such as gasoline and oil which would otherwise dissolve the foam.

Block 10 has a generally triangular cross-section, as illustrated by FIG. 3. Three primary surfaces and one surface of relatively narrow width define the generally triangular outline. An essentially flat, bottom support surface 60 typically rests on the same surface as a vehicle wheel which is to be engaged by the block. An angled back surface 70 rises from bottom support surface 60, and in the alternative may be relatively perpendicular thereto. Back 70 is disposed so as to provide strength by opposing normal forces applied to contoured surface 90, which is adapted to engage vehicle wheels.

Back surface 70 includes a handle member 80 integrally formed therewith. As readily apparent from the present illustrations, handle 80 is disposed generally on an opposite side of block 10 from contoured surface 90. Thus, block 10 may be easily manipulated even whenever surface 90 is actually engaged with a vehicle wheel. Further, with handle 80 being integrally formed with main body 20, both the main body and handle are enclosed within coating 30.

A relatively narrow top surface 100 interconnects angled back 70 and contoured surface 90. In one preferred embodiment, such top surface may have a width of approximately 1 inch, and a longitudinal length of about 6.5 inches. In the same exemplary embodiment, back surface 70 may be approximately 5 inches tall by 6.5 inches wide. Continuing around such exemplary embodiment of block 10, lower support surface 60 may be approximately 6.5 inches in each direction, with approximately the same dimensions for contoured surface 90.

Such preferred embodiment is typically intended for use with vehicles such as automobiles, campers, pickup trucks and vans. The illustration by present FIG. 3 is substantially a full scale representation of a cross-section of such preferred embodiment. Using the preferred material of expanded polystyrene indicated above, even such compact size may provide a compressive strength in excess of 1,000 pounds per block, with such block weighing only about 2 ounces. At a density of 1.5 pounds per cubic foot, Dyplast expanded polystyrene has a compressive strength at 10% deflection within a range of 21-27 pounds per square inch. Twenty-seven pounds per square inch times 42.25 square inches (resulting from an exemplary contoured surface of 6.5 inches by 6.5 inches) results in a compressive strength of approximately 1,140 pounds. Such expanded polystyrene may be used in other densities. For example, with a density of 2.0 pounds per cubic foot, the compressive strength at 10% deflexion of such material may typically be about 44 pounds per square inch. Hence, the overall compressive strength for the same size embodiment would rise to 1,859 pounds for a single block, with a weight increase for such block over the previous same size embodiment of only approximately one-half of an ounce. Because the skin effect obtained with the present coating disperses pressure from a vehicle wheel over the entire body, the full compressive strength of the main body (in this instance, of the expanded polystyrene) is effectively utilized. Thus, a practical wheel chock block of ultra-lightweight materials may be very economically provided.

Of course, the present invention is not limited to the one specific size described above. Virtually any size embodiment may be inexpensively molded from a variety of materials, such as the expanded polystyrene discussed above. While the foregoing exemplary size is primarily for smaller vehicles, an embodiment intended for use with heavier vehicles such as trucks may also be provided in accordance with features of the present invention. For example, an embodiment suitable for use with trucks may typically be about twice as wide as the embodiment described above, i.e. 13 inches. The base surface (i.e. lower support surface 60) may be increased from approximately 6.5 inches to 12 inches. Enlarging the above-discussed smaller embodiment while maintaining the proportions described above would provide a contoured support surface of approximately 12 inches by 13 inches, or 156 square inches. Again utilizing expanded polystyrene material having a density of 2.0 pounds per cubic foot, a wheel chock block may be provided in such enlarged dimensions (approximately doubled) with a compressive strength of approximately 6,864 pounds per block, while such block still weighs less than one pound.

In addition to coating 30, a further plastic cover may be readily provided over main body 20 and covering 30. Such plastic covering may essentially be transparent, while providing at very low cost a means for defining or supporting three-dimensional indicia therein (such as lettering 110 on block 10 in FIGS. 1 and 2) In such manner, block 10 may be cheaply manufactured, useful, and yet customized for promotional use by auto shops, car dealers, and the like.

While various specific embodiments of the present invention have been particularly disclosed, numerous modifications and variations to such features and elements are included aspects of the present invention. For example, various shapes thereof may be provided, with for example top surface 100 omitted, and contoured surface 90 and angled back surface 70 instead directly joined with one another. Also, contoured surface 90 may be provided relatively flat, instead of contoured.

A variety of types of plastic foams may be used with the present invention, in place of the specific expanded polystyrene embodiment discussed. Examples of such expanded or foamed alternatives include styrofoam, polystyrene, urethane and other foams or members of the plastic family, without limitation as to their construction or type. Various mixtures of such foams, and methods of forming same, such as being whipped, mixed, expanded, extruded, molded, blown, or cast, may be practiced with the present invention. Block 10 may be shaped, molded, blown, or filled by any other means or methods so as to provide a construction in accordance with features presently disclosed. Furthermore, the coating or sheathing provided on the blocks may be obtained from a variety of methods, such as being sprayed, rolled, painted, dipped, or with the further plastic cover being variously cemented thereon.

Also, the present invention may be used with vehicles in virtually any configuration which provides desired braking for the vehicle. For example, a pair of blocks may be used to surround a single (or more than one) tire of the vehicle. Alternatively, blocks may be provided on the outer sides of a pair of front and back wheels, or on both interior sides of such pair of front and back wheels. All variations and modifications which would occur to one of ordinary skill in the art, and uses for constructions so formed, are intended to fall within the scope and spirit of the present invention.

Furthermore, while specific description has been made for several exemplary embodiments above, all such language is intended as words of description and example only, and not words of limitation, which appear only in the appended claims.

What is claimed is:

1. An ultra-lightweight chock block of predetermined shape for use with a vehicle wheel, comprising:
    a generally triangular-shaped solid body of expanded polystyrene having a density generally in a range of from about 1.5 pounds to about 2.0 pounds per cubic foot and with a corresponding compressive strength at 10% deflection of from about 21 lbs. per square inch up to about 44 lbs. per square inch, said body having as one said thereof a curved wheel-engaging surface of from about 42 square inches up to approximately 156 square inches in area, so that such curved surface provides up to about 7000 lbs. of compressive strength, and said body further having as a second side thereof a relatively planar bottom surface for resting on a surface shared by a vehicle wheel to be engaged by said curved surface;
    a handle member, formed integrally with said body, and generally on an angled bracing side of said body opposite from said wheel-engaging surface thereof, for manipulation of said block; and
    a hardened latex paint coating residing over the entire outer surface of said body and said handle member thereof, and at least slightly penetrating same; wherein
    said coating provides an integral skin with respect to said body and said handle so as to distribute over the entire compressive strength of said body pressure applied to any part of said curved wheel-engaging surface thereof by a vehicle wheel to thereby maximize the effective wheel-engagement strength of said chock block, and so as to protect said expanded polystyrene body from moisture and/or petroleum-based products by providing a relatively sealed barrier therearound.

* * * * *